Fig. 5.

Feb. 14, 1950  F. A. FRITZSCH  2,497,302
AUTOMATIC LATHE CONTROL
Filed Dec. 20, 1946  8 Sheets-Sheet 6

INVENTOR.
Frank A. Fritzsch
BY
Zugelter & Zugelter
Attys.

Feb. 14, 1950   F. A. FRITZSCH   2,497,302
AUTOMATIC LATHE CONTROL
Filed Dec. 20, 1946   8 Sheets-Sheet 8

INVENTOR.
Frank A. Fritzsch
BY Zugelter & Zugelter
Attys.

Patented Feb. 14, 1950

2,497,302

UNITED STATES PATENT OFFICE 2,497,302

AUTOMATIC LATHE CONTROL

Frank A. Fritzsch, Cincinnati, Ohio, assignor to The Lodge and Shipley Company, Cincinnati, Ohio, a corporation of Ohio Application December 20, 1946, Serial No. 717,576

1 Claim. (Cl. 74—337.5)

This invention relates to a metal cutting tool of the lathe type wherein the movements of the carriage and tool slide are automatically selectively controlled, wherein the work may be operated upon from relatively opposite sides, and wherein each tool or gang of tools may be operated independently and the operation timed so that either may precede the other, and relates more particularly to means for automatically effecting, by remote control, a spindle speed and tool feed change during a machining cycle of a lathe of the class described.

Examples of machines of this character are shown, described, and claimed in United States Letters Patent No. 1,600,401, granted September 21, 1926, for Machine tool carriage, on the application of Francis B. Cockburn; No. 1,600,650, granted September 21, 1926, for Lathe, on the joint application of Edward S. Bird and Francis B. Cockburn; Patent No. 2,105,913, granted January 18, 1938, for Lathe, on the application of Frank A. Fritzsch, the applicant herein, and Patent No. 2,308,417, granted January 12, 1943, for Tool moving means, on the application of the aforementioned Frank A. Fritzsch. The Cockburn patent is directed primarily to means for obtaining tool movements; the Bird et al. patent is directed mainly to the control of such movements, and the Fritzsch patents are directed to both means for obtaining tool movements and controls for the same. The present invention is an improvement on the devices of these patents.

An object of the invention is the provision of an automatic machine having means for operating upon the work from relatively opposite sides, the means at each side being controlled by a separate feed screw operable either simultaneously or intermittently with its companion feed screw at the opposite side of the machine.

Another object of the invention is the provision of a machine automatically and selectively operable for machining different kinds of work without the use of special attachments for each kind, a change in machine setting being made by manipulating stops upon a shaft adapted for controlling, through special mechanism, the movements of the feed screws, the stops engageable by an element of the carriage and tool slide unit for translating or operating the shaft. The movements of the feed screws at opposite sides of the machine may be automatically selectively controlled for rapid and slow rotative speed during a machining cycle to cause a change of feed of the tool into the workpiece from a coarse to a fine feed or vice versa, permitting machining of complicated work without reloading or setting up for another operation.

Another object of the invention is the provision of means for automatically selectively and simultaneously operating a plurality of tool carrier operating feed screws, each feed screw operating its tool carrier for various working cycles, during which the tool may be fed toward, into and longitudinally of the work to a definite degree, the feed increased or decreased, and the depth and length of cut being positively automatically controlled, the tool being subsequently withdrawn from the work and the carrier returned to the starting position.

The invention herein provides for the automatic timed rotation of both feed screws in rapid forward and reverse traverse and forward feed directions, and further provides in conjunction with the carriage and tool slide units, means whereby for a working cycle the tool may be rapidly traversed toward the work, and slowly fed into the work until at a predetermined point of tool feed, a mechanism comes into action which increases or decreases the amount of tool feed to a further predetermined point, at which point the driving mechanism is automatically cut out, with the tool feed continuing under auxiliary non-positive driving mechanism, until the feed of the tool is positively arrested. At this period the tool can be maintained stationary for a definite interval which may be governed by the number of work revolutions before return traverse of the tool commences, the return traverse bringing the tool to its starting position. For another cycle the carriage can be traversed to bring the tool to a setting position, the tool traversed rapidly toward the work then fed slowly into the same, and the tool thereafter rapidly withdrawn to fully retracted position and returned to the starting point A further object is the provision of automatic means for selectively changing the spindle speed during a machining cycle, said means being adjustable for relative timing without affecting the type of cycle used on the automatic lathe under normal operation.

Another and important object of the invention is the provision of means for automatically changing the spindle speed of the lathe during a machining cycle, from a high speed to a low speed, or vice versa, without a hesitation in the drive. This is important from the standpoint of tool life, since there should never be a hesitation during the machining operation, as those skilled in the art will appreciate.

Another object is the provision of means for incorporating more than one range of spindle speed changes during a work cycle, whereby such speed changes are automatically obtained from a remote control position in a novel manner.

Still another object of the invention is the provision of means for disengaging the feed and/or speed change mechanism when the machining of a particular workpiece does not require the use of either or both of said feed and speed change mechanisms.

The above operations in cycles may each be automatically performed after initial starting by a hand lever. Common power and traverse transmission trains connected with the mechanism of the feed boxes provide for the operation of the feed screws simultaneously or independently. Each screw may be stopped, started, reversed and made to rotate at varying speeds in forward and reverse directions independently of the other, making possible the timing of tool movement at relatively opposite sides of a piece of work in such manner that one tool may approach the work at one rate of speed, make a cut, and pause while the opposite tool performs a similar or different operation upon the piece, the operations being automatic from the time they are initiated until the end of the cycle.

Other objects and certain advantages will be more fully disclosed in the following specifications and upon the accompanying illustrations in which:

Fig. 18 is a partial view in section, taken on line 18—18 of Fig. 17 showing the sprags of the over-run clutch.

The manufacturing industry has been in need of a machine of the lathe type having automatic controls for spindle speed changes in order to expedite the machining of precision parts. The present invention provides the means for attaining this objective, as will be hereinafter disclosed.

Referring to the drawings, 1 indicates the base of the machine which has the form of a pan providing supports 2 to which is bolted the bed 3, the pan also providing a coolant reservoir, having a pump arranged therein; and attached thereto, for forcing the coolant upwardly to the machine. The bed 3, the detailed structure of which is more fully described in the aforementioned Patent No. 1,600,401, granted September 21, 1926, provides a pair of coplanar, parallel rails 5. Upon the rails are mounted a headstock 7 and tailstock, not shown, the tailstock being of any commercial type adapted for use on an engine lathe. Each of the rails of the bed is machined to provide for gibbed engagement of the tool carriages, said tool carriages herein being designated front and rear, respectively 9, 10. The rails each independently support and guide a tool carriage having a tool-slide and tool thereon; whereby the work may be simultaneously and selectively operated upon from relatively opposite sides, the carriage and tool-slide construction herein being a duplicate of that described in the above mentioned Letters Patent.

The carriages and tool-slide units are of duplicate construction and each is gibbed to its respective rail. The front carriage 9 on the rail 5 has its cutting tools arranged to engage the work at the horizontal center thereof, pressure or strain upon the carriage being in a downward direction while the pressure or strain on the rear carriage 10 is in an upwardly direction. The front carriage therefor has a rail engagement for supporting it against downward pressures, and the rear carriage a rail engagement for supporting it against upward pressures. Further description of the structure and operation of the carriage and tool slide is thought unnecessary, inasmuch as reference may be had to the Letters Patent before mentioned.

Each carriage has its feed screw shafts 25, 26 respectively front and rear. The screws are disposed longitudinally at opposite sides of the machine bed and each screw at the tailstock end is journaled in a bearing, while at the headstock end each is coupled to a screw drive shaft contained in the front and rear control boxes 27 and 28 respectively, the manner of coupling being hereinafter more fully described.

Two transmission controlling shafts 30, herein called stop screw shafts, are employed, one for each carriage, and the same extend parallel with respective feed screw shafts 25 and 26 and beneath the same. Each shaft 30 is longitudinally slidably journaled at the tailstock end in a bearing, and the opposite ends are coupled to shafts 114 which are mounted within the control boxes. The stop screw shafts 30 are both threaded for their length between their bearing points, and each shaft carries two pairs of nuts, one a jamb nut, engageable with respective opposite sides of a traveler block on the carriage for operating the control box mechanism, to stop and reverse slide and carriage action. The distance between the pairs of nuts governs the period of carriage and tool-slide traverse upon the rail in either forward or return directions, the nuts as trip dogs being engaged with the traveler block. One pair is engaged when the carriage moves in a forward direction toward the headstock, and the other pair is engaged during return carriage traverse toward the tailstock.

Since the said front and rear control boxes are of duplicate construction, each box being rigidly secured to its respective side of the lathe bed 3, the description will therefore be confined to the rear control box 28.

The control box, as described in the Bird et al. Patent No. 1,600,650, contains mechanism operable for obtaining appropriate feed screw movements to cause, in conjunction with the mechanism of the carriage, successive rapid traverse of the tool towards the work; tool slow feed towards the work; cutting feed of the tool to the end of the cut; friction feed to a positive stop; pause of the tool after the end of the cut is reached, to allow cut to run out; rapid traverse of the tool away from the work to full retracted position; and return of carriage to initial position. As a further advantage in the flexibility of this lathe, means have been added to the control box for automatically causing a change in feed during the cycle of the machine. It is therefore now possible to change automatically from a coarse to a fine feed or vice versa while the tool is engaged in cutting the workpiece, thus permitting the machining of complicated workpieces in a minimum of time without reloading or setting up for another operation. The means for accomplishing this will be hereinafter more fully described.

For the machine shown, two systems of transmission gearing are employed for rotating the feed screw. One for obtaining high speed results for reversible quick traverse of the carriage and tool slide, and which may be regarded as independent of the headstock gearing for rotating the spindle, and a second for slow speed, results in establishing a transmitting connection with the headstock gearing through the lathe spindle.

The transmitting control for the feed screw is started manually, the hand lever control being such that the respective transmissions for the two feed screws at opposite sides of the lathe can be operated either independently by means of a hand lever B, or simultaneously by means of another hand lever F, the manual starting control operating a clutch for the high speed transmission and for use, as forward direction of rotation. Levers B and F may be duplicated at opposite sides of the machine. After starting, the transmission control is automatic, for obtaining a particular traverse cycle for the cutting tool, as to advance the tool from a starting position rapidly toward the work, thence under a slower or cutting feed into the work; for changing the cutting feed from coarse to fine, or vice versa, at predetermined points in the cycle, while the cutting tool or tools are engaged with the workpiece; for depth cutting or facing and, after the tool has been slowly fed into the work a definite turning depth, for moving the tool at a cutting speed longitudinally of the work for the required and full turning length, and thereupon on any retreating action, retreat quickly from the work and return to a starting position.

The hand lever for starting control operates the trip rod or shaft 30. Manually shifting the trip rod or shaft 30 in an appropriate direction operates a fast feed clutch for throwing in the high speed transmission into connection with the feed screw 26 for forward direction of drive. After starting, the control is automatic, power operated clutch controlling mechanism operating for throwing out the fast feed clutch and throwing in the slow feed clutch. The slow feed continues until the carriage or tool has moved or translated the required amount to operate the trip rod or shaft 30, whereupon the slow speed clutch is thrown out but with the slow feed continuing through a friction drive intermediate of the slow speed transmission and screw feed shaft operated by the trip rod or shaft in its movement for throwing out the slow speed clutch. This permits the feed shaft 26 to be revolved until the cut completely runs out. If the workpiece is such that a change of feed will improve its finish or lessen the time of machining, the feed change adjustment mechanism may be engaged and set so that at a predetermined point between the throwing in and throwing out of the slow feed clutch, the feed change clutch will automatically shift and cause the desired feed change. The tool feed change mechanism will be described later. The friction drive operates a cam which actuates the power operated clutch controlling mechanism for completing the power clutch control and release the control of the fast feed clutch for automatic operation and movement of the fast feed clutch for fast feed reverse to retreat the tool and carriage to its starting position whereupon the trip rod or shaft 30 is again operated by the moving carriage or tool slide propelling member for throwing the fast feed clutch to its neutral position. In some cases it may be desirable to change the speed of the spindle during a machining cycle, as for instance in facing a workpiece of large diameter. In this case, the selected spindle speed is relatively slow, but as the tool progresses into the work, the spindle speed, at a predetermined point in the cycle may be increased to the end of the cut, thereby to lessen the time required in the facing operation. The spindle speed change is, of course, automatically controlled.

The transmission and controlling mechanism for the feed screw shaft is compactly organized and enclosed within a transmission casing or box 28 mounted upon the lathe bed at the headstock end.

Within this box (see Figs. 5 and 6), disposed longitudinally thereof, all in parallel relation, are mounted five shafts; a drive shaft 110 coupled to the feed screw 25; a pause friction shaft 111 intermittently rotatable by said drive shaft through suitable mechanism; a clutch shaft 112 colinear with the pause friction shaft 111, upon which are slidably mounted the traverse clutch fork 116 and feed clutch fork 117; a traverse trip shaft 113 shiftable by suitable mechanism for throwing out the traverse clutch 118; and a shifter shaft 114 as an extension of the stop screw shaft 30, coupled with said shaft and operable thereby to actuate traverse and feed clutch forks respectively 116, 117, which forks in turn control the actuation of the forward and reverse traverse clutch 118, and the feed clutch 119. The drive shaft 110 is held at one end in a bearing at one side of the box and is counterturned and machined to provide an enlarged head 120 and a counterturned end portion 101, having a socket 121 therein into which is adapted to be fit an extension 122 of the splined coupler shaft 123, which shaft is rotatively stepped in bearings in the side wall of the box, its outer projecting end being coupled with the feed shaft 26 in a manner hereinafter described.

Upon the splined portion 123 of the drive shaft is mounted a sleeve 125 carrying circumferentially thereof a worm 126. A spur gear 127 is splined at 101 upon said shaft 110. Tapered teeth formed on the abutting faces of the spur gear 127 and the splined sleeve 125 provide an overload or disconnect clutch as indicated at 102, a spring 103 of the proper strength forcing the teeth on the sleeve 125 into engagement with the clutch teeth on the spur gear 127. Any stoppage or overloading of the feed screw 26 will cause the driving teeth at 102 to force the spring 103 back, thus disengaging the drive to the feed screw. As the machine continues to run the rattling of this clutch warns the operator to check for dull tools or other interferences. The safety clutch mechanism thus protects the machine during all phases of the machining cycle including the traverse mechanism.

The feed worm gear 129 has an extension sleeve 128 which is rotatively journalled in the bearing 130, midway of the box 28, and rotatively engages the head 120 of the drive shaft. The sleeve is thus rotatable upon the drive shaft and forms a support or bearing for said shaft. Set within a socket 132 in the side of the feed worm gear is a feed clutch ring 133 having clutch teeth thereon, said ring being non-rotatively attached to the worm gear by screws. Within this ring is disposed a flanged bushing 134ª, the flange being engaged against displacement between the back end of the ring 133 and a washer placed within the socket.

Within the bushing surrounding and clear of the drive shaft, is rotatively mounted a friction ring 134 having the peripheral notch 135, into which notch extends the end of a pin 136 projecting from and rigidly held in the feed clutch 119, which clutch in turn is non-rotatively but translatively engaged with the longitudinal splines 137 of the drive shaft. At one end of the splined portion of the shaft is formed a shoulder 138 against which are engaged thrust washers, and against the washers is rotatively placed a bushed forward traverse miter gear 139. The shaft is further provided with an opposingly related reverse traverse bushed miter gear 140 which is rotatable upon the shaft adjacent to the bushed bearing 141. A drive miter gear 148 is in mesh with both gears 139, 140, (see Fig. 5) said gear being attached to a shaft 149 (see Fig. 5) mounted cross-wise of the box, and extending therebeyond at the back, and coupled with the power traverse gearing in a manner hereinafter described. The end of the drive shaft 110 is threaded, a nut 150' is pinned thereto at the outer side, and abuts the casing, to prevent end play. The portion of shaft 110 between the two miter gears 139 and 140 is longitudinally ribbed as at 142. Ribs 142 are engaged by traverse clutch sleeve 118 having teeth T at its opposite ends disposed to mesh with corresponding teeth on one or the other of miter gears 139, 140. The sleeve is grooved and said groove is engaged by the yoke 145 of the traverse clutch fork 116 which has spaced projections 146, 147, alternately engageable by the finger 147ª of the starter shifter fork 148ª mounted upon the shifter shaft 114, and held from rotation thereon by a pin 148ᵇ projected into a slot 148ᶜ of said fork. The shaft 110 is in axial alignment with the feed screw shaft 26 with which it connects and may be referred to as an extension of said screw shaft.

The worm gear 129 when connected with the shaft 110 through the clutch 119, constitutes the slow speed drive for the feed screw shaft 26, the worm gear 129 being driven by the spindle through the headstock gearing of the lathe. The worm gear 129 can also be connected to drive shaft 110 and feed screw 26, through an intermediate friction transmission 104, 155, 158 connecting worm gear 129 and spur gear 127 keyed on shaft 110 independent of the clutch 119, the friction transmission being utilized for continuing the screw feed shaft rotation after the clutch 119 has been thrown out to allow the tool to be fed to the full end of cut, and operate a power clutch control after the carriage or tool has been brought to the positive stop limits of the feeding traverse, enabling the work to be turned to micrometer precision, under automatic control. This necessitates a slight pause in the tool or carriage traversing cycle to effect a change of transmission, the friction drive yielding to any abnormal resistance to rotation of the screw shaft, as for instance due to the dead stop limit encountered in the traverse of the carriage or tool, to avoid injury to the parts although permitting rotatoin to a clutch controlling cam. Therefore the intermediate friction transmission is herein designated as pause mechanism.

Figures 6, 16:
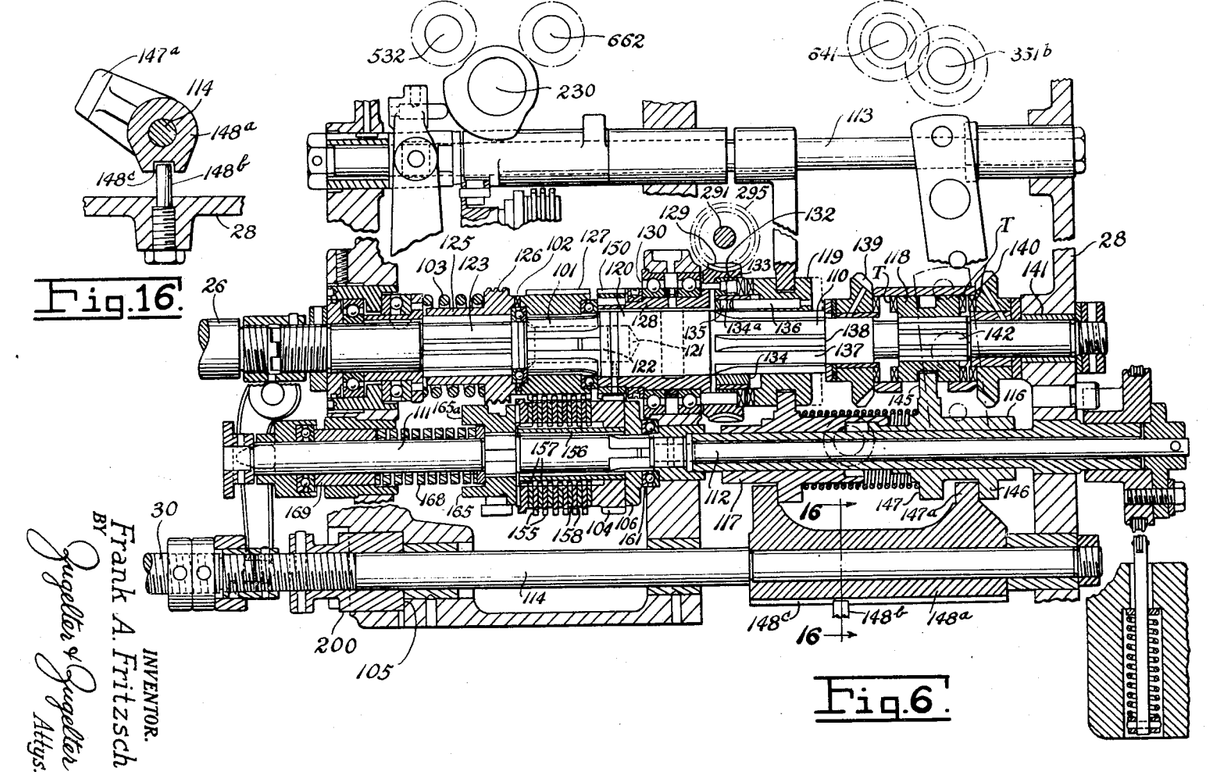
Fig. 6 is a diagrammatic or a developed view of the mechanism of the control box shown in Fig. 5.
Fig. 16 is a view in section taken on line 16—16 of Fig. 6.

Upon a counterturned portion of the feed worm gear sleeve extension 128 is keyed a spur gear 150 (see Fig. 6) having the same pitch as the spur gear 127 upon the splined end portion 101 of the shaft 110. The gear 127 is in mesh with toothed friction discs 155, said discs being rotatively mounted upon a sleeve 156 keyed to the pause friction shaft 111, while the gear 150 is in mesh with the gear 104 also rotatively mounted upon the sleeve 156. The friction discs 155 are mounted between alternate friction plates 157, said plates being provided on their inner diameter with teeth which are in mesh with cooperating splines upon the periphery of the keyed sleeve 156. The gear 104 on the sleeve 156 acts to continue to drive the screw after the feed clutch 119 is disengaged and until the tool reaches the end of the cut and the dead stop 200 is in contact with the control box as at 105 (Fig. 6). Interposed between the friction discs 155 and the friction plates 157 is friction material 158, the same being attached in a suitable manner at each side of each friction disc.

The pause friction drive for feed screw 26 is from shaft 291 and worm 295, through worm gear 129, gear 150 carried by sleeve 128 of worm gear 129, gear 104 and the friction clutch discs 155 and 158 disposed on shaft 111, and gear 127 driven by splines 101 on coupler shaft 123 to the feed screw.

Further explanation of the control mechanism is deemed unnecessary here, since a full disclosure may be had by reference to Patent No. 1,600,650.

By adding to the control box the mechanism hereinafter described, automatic feed and speed changes are obtainable, either simultaneously, alternately, or separately. The automatic speed change mechanism will be described first, and later the automatic feed change mechanism.

In order that the tool units may be caused to operate selectively and simultaneously, or alternately upon a given piece of work from opposite sides thereof, common traverse and power gearing connection with both control boxes is necessary. The transmission means consists herein of a rapid traverse gear train and a spindle gear train, operated from a common shaft. Only the main elements of the trains will be referred to by reference numerals. The gearing is supported on suitable shafts, detailed description of which is herein omitted for the sake of brevity and clarity.

Figure 3:
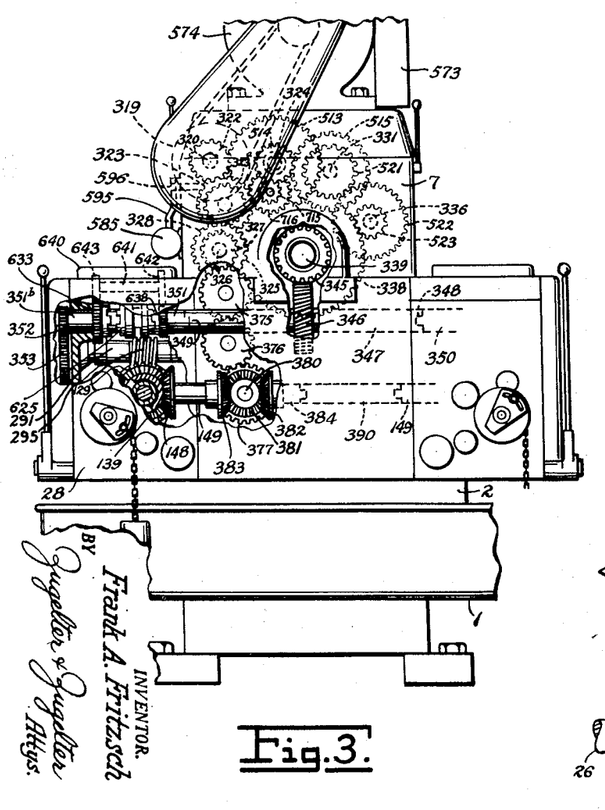
Fig. 3 is an end view at the headstock end of the lathe, parts being broken away to show the gearing connections respectively between the pulley power shaft, spindle and control boxes, and between the pulley power shaft, rapid traverse gearing, and control boxes.
Figure 4:
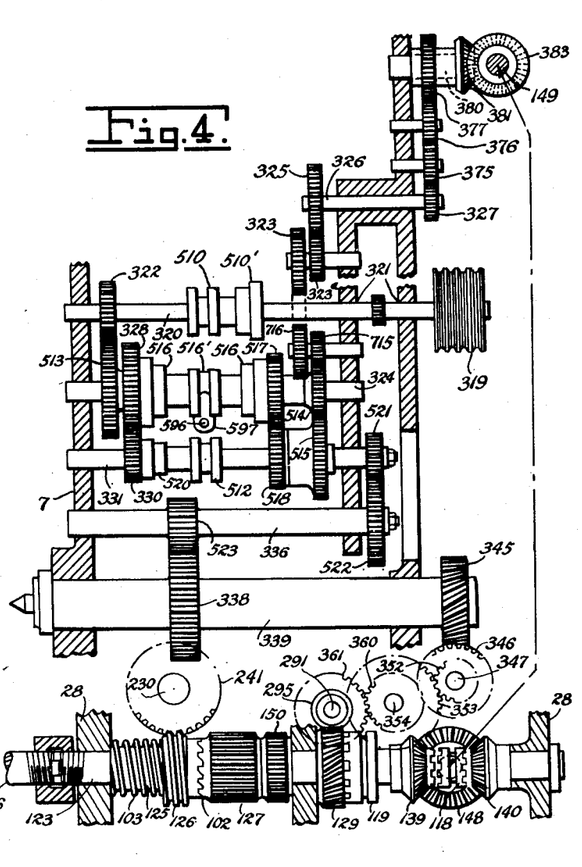
Fig. 4 is a diagrammatic, or developed view illustrating the power and rapid traverse gear trains relative to spindle, and to the feed screw drive shaft, in the rear control box.

The power is in this instance procured through a pulley 319 mounted upon the pulley shaft 320 supported in a suitable bearing at the upper rear end of the headstock (see Figs. 3 and 4). A gear 322 upon the inner end of the pulley shaft is engaged with the corresponding gear 513 mounted upon the shaft 324 in the headstock casing. From this shaft the headstock gearing and the rapid traverse gearing receive motion, the rapid traverse being connected through a chain of gears to be described later.

Power to the spindle is transmitted in the following manner: (For purposes of clarity, the number of teeth in each gear will be given, but it is in no wise to be construed that the present invention is limited to these gear ratios. It is to be understood that other gear ratios to produce other combinations of speeds are possible within the scope of the appended claims.) The drive enters on shaft 320 through a multiple disc type clutch 510 mounted on this shaft for engaging or disengaging the shaft from the motor driven pulley 319 keyed to said shaft. The clutch 510 is shifted through a lever mechanism 511 (Fig. 9) which connects with a brake clutch collar 512 on shaft 331. Clutch collar 512 actuates brake 520 (Fig. 4) of the multiple disc type, the free plates of which are held against rotation through keys contained in a ring sleeve (not shown) which is rigidly secured to the frame of the headstock 7. As the starting lever I (Fig. 9) is operated the first motion disconnects the brake 520 (Fig. 4) on shaft 331 and further motion engages the clutch 510 on the shaft 320. In stopping the machine the reverse occurs. As the lever I is operated, the clutch collar 510' operates to disengage clutch 510 while further motion of the lever applies the brake 520, through the brake clutch collar or spool 512 on shaft 331. The reason for separating the clutch and brake members will become more apparent as the description of this headstock design progresses. The drive from the shaft 320 to the shaft 324 is transferred through the thirty-four-tooth gear 322 and the fifty-one tooth gear 513 keyed to their respective shafts. Also keyed to the shaft 324, near its opposite end, is the twenty-three tooth gear 514, so that both gears 513 and 514 on shaft 324 will be driven as long as the clutch 510 on the shaft 320 is engaged. The twenty-three tooth gear 514 on shaft 324 drives the sixty-two tooth gear 515 on shaft 331. The said sixty-two tooth gear 515 is constructed with a sprag type overrun clutch 515'. A series of sprags 515a loaded by a spring 515b are assembled within the bore of the hub 515c of the sixty-two tooth gear 515 and engage a sleeve 515d which is keyed to the shaft 331, said sleeve being within the overrun clutch and gear 515 as shown in Fig. 18. Disposed on shaft 324 is the multiple disc double clutch 516 which is operated by collar 516'. When said double clutch is in neutral, as shown in Fig. 4, the twenty-three tooth keyed-on gear 514 on shaft 324 transfers the drive to the sixty-two tooth gear 515 which in turn drives shaft 331 through the frictional engagement of the sprags 515a in the overrun clutch with the sleeve 515d keyed on shaft 331 and the hub 515c of gear 515. Upon the hub of the keyed fifty-one tooth gear 513 on shaft 324 is mounted another fifty-one tooth gear 328 and free to rotate on ball bearings 328a on said hub. Similarly a forty-five tooth gear 517 is mounted on the hub of the free running twenty-three tooth gear 514, also free to rotate upon ball bearings 517a mounted on the hub of said keyed gear 514. These free running gears 328 and 517 are provided with splined extensions 516a to engage the free discs or plates of the double clutch 516. Thus the double clutch 516 is capable of engagement with either of the free running gears 328 and 517 on shaft 324, depending on whether a slower or faster drive is desired. If the double clutch 516 is shifted to the left from neutral, engaging the free running fifty-one tooth gear 328, it will cause the said gear 328 to become fixed to shaft 324, thereby to drive shaft 331 through the thirty-four tooth gear 330 keyed to shaft 331. When this occurs shaft 31 takes on a higher speed and thus shaft 331 to overrun within the sixty-two tooth gear 515. This is made possible by reason of the fact that the sprags in the overrun clutch tilt slightly axially away from the sleeve and release the driving load from the twenty-three tooth gear 514. It is thus possible to increase the speed of shaft 331 three times by the use of the aforementioned gears without a hesitation in the drive, since the amount of angular shaft motion required to release the sprags in the overdrive is infinitesimal. This is important from the standpoint of tool life since there should never be a hesitation during the machining operation.

If a slower speed than that obtained as above described is desired, the double clutch 516 on shaft 324 is shifted to the right, in which case the forty-five tooth free rotating gear 517 becomes fixed to said shaft by engagement of the free discs or plates of the double clutch with the splined extensions of gear 517. The drive is thus transferred to shaft 331 through the forty tooth keyed gear 518 on shaft 331. While the speed thus obtained is slower by approximately one-fourth than when the gears 328 and 330 are in driving engagement, this speed is faster than when the gears 514 and 515 are in driving engagement with the double clutch 516 in neutral, hence because of clutch 515' the shaft 331 will again overrun within the sixty-two tooth gear 515. This change of speed will also take place without a hesitation in the drive. When a slow speed is desired the double clutch 516 is shifted to neutral, the drive then being transferred, without hesitation, from shaft 324 to shaft 331 through the twenty-three tooth keyed gear 514 and the sixty-two tooth gear 515 mounted on their respective shafts.

As thus exemplified, by using the gear ratios specified, it is possible to change the speed of the spindle, without hesitation, from medium to low, which may be one-third of medium speed, or from medium to high, which may be one-third faster than medium speed. Likewise it is possible to cut from low speed to medium speed which may be three times faster than low speed, or from low to high speed, which may be four times faster than low speed. Similarly, the drive may be shifted from high speed to medium speed, which may be three-fourths of high speed, or from high speed to low speed, which may be one-fourth of high speed. It can be readily seen that by varying the gears other combinations of speeds are possible within the scope of this structure, as the requirements of each particular job may demand.

Figure 9:
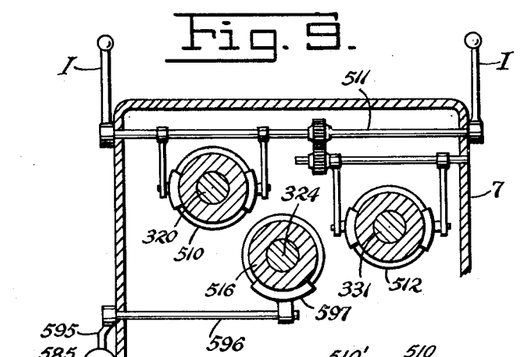
Fig. 9 is a diagrammatic view illustrating the headstock clutch and brake arrangement for controlling automatic spindle speed changes.

Inasmuch as an overrun clutch has been introduced in the structure, it is conclusive that if the initial drive should be suddenly stopped by disengaging the clutch 510 on shaft 320, the momentum of spindle 339 could cause said spindle to continue to rotate since it overruns the sprag clutch 515'. It is for this reason that te brake 520, and its actuating spool or collar 512, are introduced at a point beyond this overrun clutch on shaft 331. As can be seen in Fig. 9, the drive may be started from either side of the headstock 7 by the starting lever I. The lever mechanism 511 is suitably mounted within the headstock frame and is so designed as to shift the starting clutch 510 on shaft 320 in one direction while shifting the brake clutch 520 on shaft 331 in the opposite direction. As hereinbefore stated, the first motion of the lever I in starting the machine disconnects the brake 520 on shaft 331, and further motion of the lever I in the same direction shifts the clutch 510 in the opposite direction and into engagement to drive the shaft 320. In stopping the machine, the reverse takes place, that is to say, the first motion of the lever I disengages the clutch 510 while further motion in the same direction applies the brake 520 on shaft 331, thereby stopping rotation of the spindle 339 in the headstock.

Referring again to Fig. 4, the drive from shaft 331 continues to the spindle 339 by way of the pick-off gears 521 and 522 keyed to the shafts 331 and 336 respectively, which drive the spindle 339 through the pinion 523 on shaft 336 and the gear 338 fixed to the spindle. Attached to the rear end of the spindle is a helical gear 345 in mesh with a companion helical gear 346 mounted upon a cross coupling shaft 347, which shaft is suitably coupled as at 348, 349, respectively with the front and rear auxiliary feed drive shafts 350, 351. The shafts 350, 351 are identical in construction and each is mounted in the upper part of its respective control box (transversely of the box and at right angles to the shaft hereinbefore described). Inasmuch as the connections between the feed drive shaft and the worm shaft are identical, the description from this point will refer to the gearing connections in one of the boxes only, the rear.

Attached at the outer end of the shaft 351 is a spur gear 352 which may be a change gear. The change gear 352 is in mesh with a second change gear 353 keyed to a bushing rotatable upon a stud shaft 354, which is held rigidly in a bearing at the front wall of the box. Keyed to the same bushing and spaced from the gear 353 is a second gear 360, which gear is in mesh with the gear 361 keyed at the outer end of the worm shaft 291, which is suitably mounted in aligned horizontal bearings. Upon said shaft 291 is keyed a sleeve having the worm 295 thereon meshing with the feed worm 129. A thrust bearing is interposed between a shoulder upon said sleeve and the back bearing. The rotation of the worm 295 is in the same direction and the thrust bearing receives and sustains the thrust submitted to the shafts.

The power traverse train is driven from constant speed gear 514, and then through gears 715, 716, 323, 323ᵃ, 325, 327, 375, 376, 377, said gears being mounted upon suitable shafts supported in the rapid traverse gear casing at the back of the headstock casing. The gear 377 is fixedly mounted on the hub of a miter gear 381, which hub is rotatable upon a stub shaft 380. Miter gear 381 is in mesh with companion miter gears 382, 383, keyed to respective shafts 384, 149, said shafts being held in suitable bearings in a casing attached at the rear of the control box. The stub shaft 384 is connected by coupling member 390 with the drive shaft of the opposite control box. Shaft 149 is rotatively held in a suitable bearing at the rear of the control box, and having at its inner end the drive miter gear 148 meshing with both traverse miter gears 139, 140, running free on shaft 110.

Figure 10:
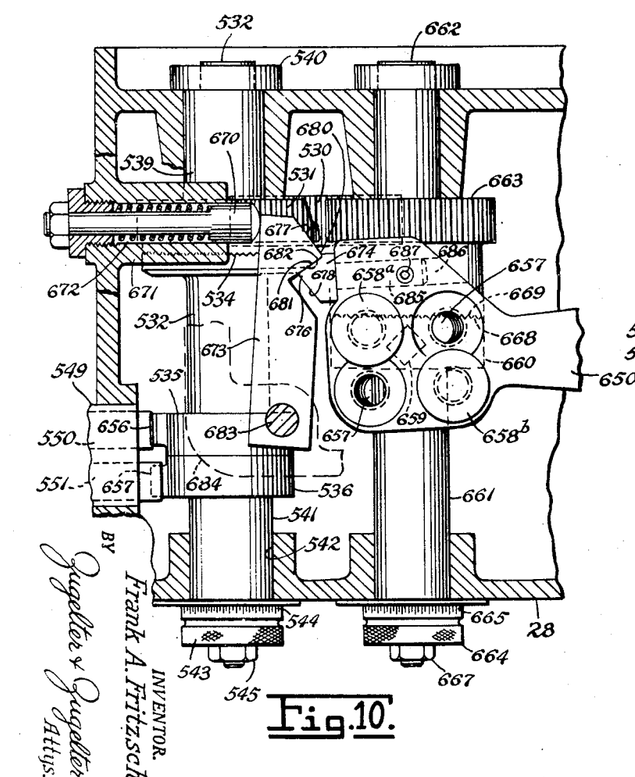
Fig. 10 is a fragmentary top view, partly in cross section, showing the feed change trip shaft and the speed change cam shaft.
Figure 11:
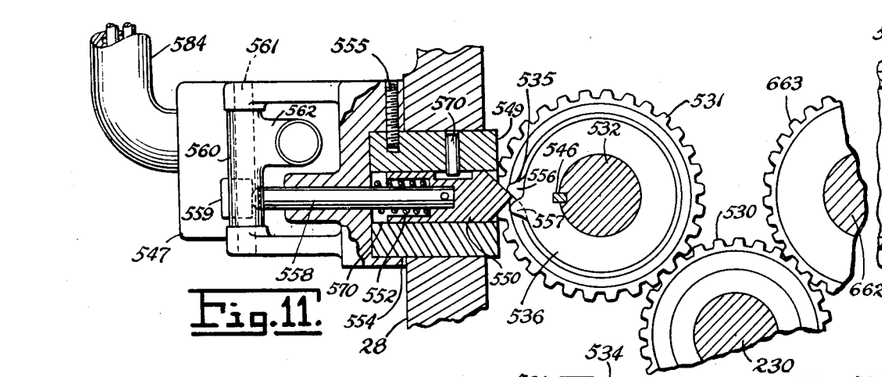
Fig. 11 is a fragmentary view, partly in cross section, illustrating the speed change cam and plunger mechanism.

The drive to the automatic speed change actuating mechanism is taken from the shaft 230 which maintains register with the feed screw drive through the worm gears 126 and 241 on the shafts 123 and 230, respectively (see Fig. 4). Keyed to shaft 230 and interposed between the worm gear 241 and the rear wall of the control box is the gear 530 which meshes with the co-operating gear 531 on the cam shaft 532 (see Figs. 10 and 12). By increasing the height of the front and rear control boxes over those of the original Patent No. 1,600,650, provision may be made for journaling the cam shaft 532 transversely of the control boxes obliquely above and parallel to the shaft 230, as shown in Fig. 11. A sleeve 533 is nonrotatively but slidably keyed to the cam shaft 532, said sleeve, being provided on one end face thereof with fine teeth, in this case one hundred and twenty, to selectively engage a similar number of teeth on the end face of the keyed driven gear 531, as indicated at 534 on Fig. 12. The trip cams 535 and 536 are also nonrotatively but slidably keyed to the cam shaft 532. Within a socket 537 of the driven sleeve 533 is a compression spring 538, said spring abutting against the gear 531. The rear end of the speed change cam shaft 532 is journaled in the bearing 539 of the control box 28 and secured against displacement by the collar 540 pinned to said shaft. A bushing 541 is keyed to the forward end of the cam shaft 532, said bushing being rotatively mounted in a bearing 542. The outer end of the bushing 541 extends beyond the box wall and is enlarged to form a knob 543, which knob is provided with circumferential graduations 544 registrable with a mark 582 upon the outer face of the box 28. The outer end of shaft 532 is reduced and threaded, and a washer and jamb nut 545 placed thereon.

The adjusting sleeve 533 can readily be set selectively to any of the one hundred and twenty tooth positions which, in the exemplified method, permits adjustments within any $\tfrac{1}{16}$" position of the carriage or cross slide, since one revolution of the cam shaft 532 equals 42.6 revolutions of the feed screw 26 or within 21.3" traverse of the carriage. When the nut 545 is backed off, the spring 538 urges the sleeve 533 outward to follow the nut, thus disengaging the fine teeth of the said sleeve from the cooperating teeth of the gear 531 and making adjustments simple. If the requirements of a particular piece of work do not necessitate a change of spindle speed during a work cycle, the speed change mechanism may be made inoperative by backing the nut 545 off the shaft 532 a sufficient distance to disengage the teeth at 534. When the nut 545 is thus backed off, the force of the spring 538 holds the sleeve 533 away from contact with gear 531.

Since there is some loss in operation of the cams 535—536, it will be noted that there are limitations in the change of speed with relation to the carriage travel. That is to say, a minimum travel of ¾" of the carriage is required to cause an automatic spindle speed change, but a maximum travel of 20¾" is possible before actuating the speed change. If the machine is set for the minimum travel before changing the speed, the carriage will move in the changed speed for only 20¼" more. As can readily be visualized, a change in the cam structure could permit variations of spindle speed changes from low to high and back to low, or from medium to high and back to medium, or from low to medium and back to low, or vice versa, or as repeatedly as desired if the cams 535, 536 are designed within the scope of the mechanism. It is to be understood that the number of teeth at 534 are not limited to one hundred and twenty, as exemplified herein, but may be more or fewer in number as desired.

Figures 12, 16:
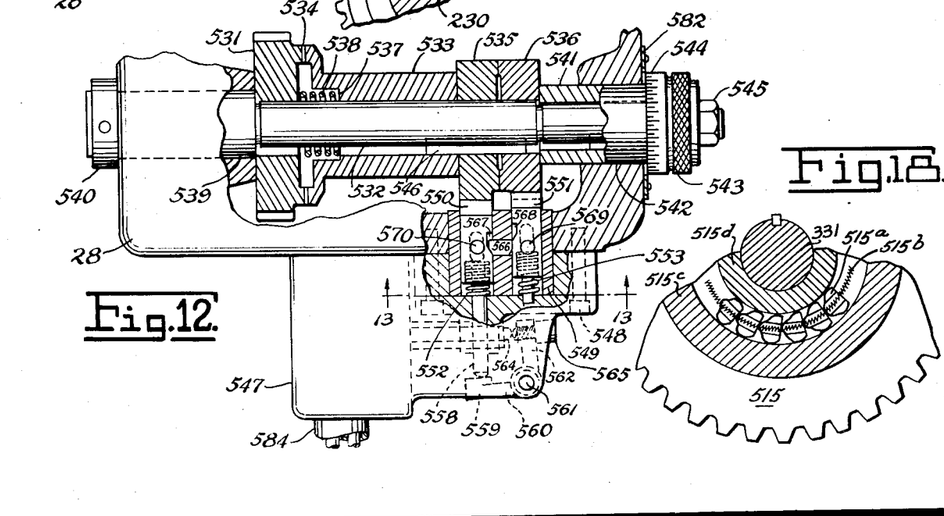
Fig. 12 is another view, partly in cross section, of the speed change cam and plunger mechanism.
Figure 13:
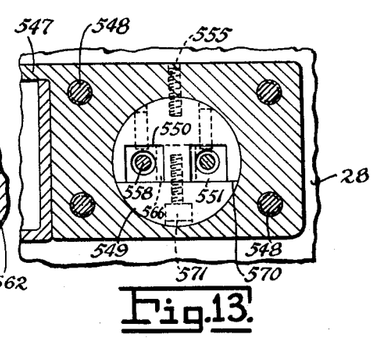
Fig. 13 is a section view, taken on line 13—13 of Fig. 12.
Figure 14:
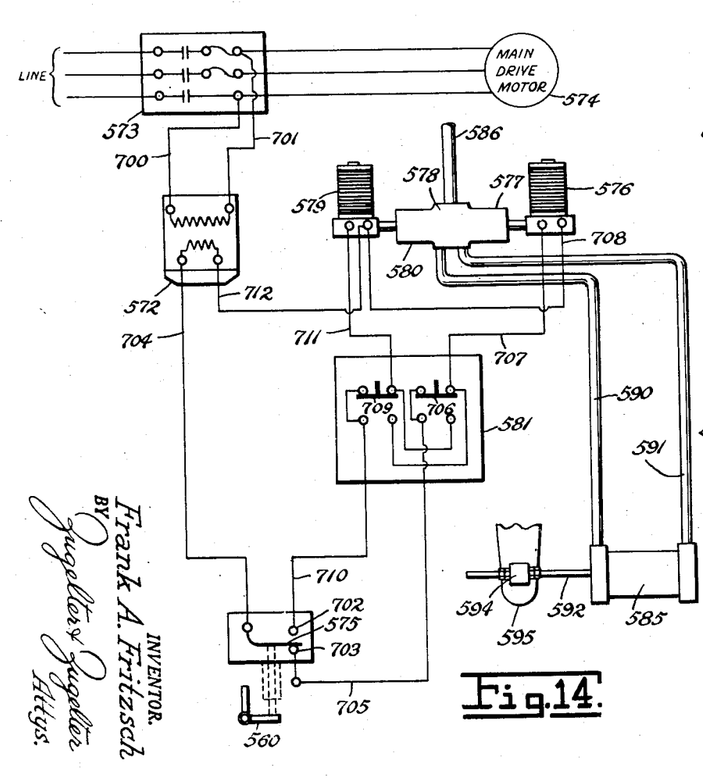
Fig. 14 is a diagram showing the wiring for the solenoid operated air valve for controlling the automatic spindle speed change.

As shown in Fig. 11, the cam arrangement consists of two cams 535, 536 having the same outline or contour and slidably mounted on the shaft 532 in fixed angular position relative to each other and fixed against rotation on the shaft by a key 546. The angular relation between the cams is fixed by the location of the keyways in the respective cams. As indicated in Figs. 11 and 12, a bracket 547 is bolted to the outer wall of the control box 28 by means of the screws 548. The said bracket centralizes a cylindrical member 549 which is machined to receive the square plungers 550, 551, said plungers being normally urged toward the periphery of the cams 535, 536 by the springs 552, 553 fitted behind the plungers and abutting the bracket 547. Cylindrical member 549, which is constructed in two parts for machining purposes, is held against slidable and rotative movement in the control box wall and bracket bore 554 by means of the set screw 555. As shown in Figs. 11 and 12, the square plunger 550 is being pressed back by the projection 556 of the cam 535 passing over the angular tip of said plunger, and in so doing, moves the plunger rod 558, which is pinned to the square plunger 550 as indicated, into contact with an arm 559 of the bell crank lever 560. The said bell crank lever is pivoted as at 561 on the bracket 547, and is provided with an integral arm 562 disposed at right angles to the lever arm 559. As the bell crank lever arm 559 is forced back by the action of the cam 535 and plunger 550, the lever arm 562 in turn actuates a Burgess type micrometer switch button 564, the operation and general construction of which is described in connection with Fig. 14. This micrometer switch preferably is housed within the bracket 547, and is normally open-circuited.

Since a certain amount of overtravel is permitted in the design and manufacture of the plungers, final adjustment may be made by means of a screw 565 threaded into the bell crank lever arm 562 and disposed to engage switch button 564.

An interlock plunger 566 is provided between the square plungers 550, 551, and at right angles thereto, adapted to alternately enter cooperating recesses 567, 568 formed on one side of each of said square plungers, as shown in Fig. 12. Angles formed on the sides of the recesses as well as on the ends of the interlock 566 are such as to permit free reciprocal motion of the interlock as the square plungers are alternately pressed back and forward. The interlock plunger 566 locks one square plunger against retraction while its companion plunger is forced forward by its compression spring. The square plungers are restricted in their forward movement by the pins 569, 570 inserted in the wall of the cylindrical member 549 at appropriate points, as indicated in Figs. 11 and 12. As the square plunger 550 is retracted into the cylindrical member 549, thereby to close the Burgess micrometer switch by the action hereinbefore described, the force of the spring 553 urges the square plunger 551 forward, at the same time shifting the interlock 566 to the left and into the recess 567 of the square plunger 550, thus locking said square plunger in its retracted position and maintaining the Burgess switch closed until the end of the cycle, at which time the control box reverses and the cams 535 and 536 return over their same path. When the control box reverses, cam 535 passes by the compressed plunger 550, and cam 536 presses the square plunger 551 back into the cylindrical member 549, at which time the interlock 566 releases square plunger 550, which is forced forward by the spring 552. As the square plunger 550 moves forward, the interlock plunger 566 is shifted to the right and into the recess 568 of the square plunger 551, where it remains until it is released by the action of the cam 535 on its forward stroke. As the square plunger 550 moves forward, pressure on the bell crank 560 is released, which allows the Burgess micrometer switch to return to its normal position, said switch being held in such position by a spring action embodied in same. As noted the mechanism is reset at the return cycle in very close proximity to the position at which the contact was made during the forward stroke. For ease of machining, the cylindrical member 549 is split at 570' and bolted together with screws 571.

The wiring diagram (Fig. 14) shows the method of operating the electrical parts of the automatic speed change. A voltage transformer 572 is incorporated for safety reasons. Energy from the line wires is taken directly from the magnetic starter 573 of the main drive motor 574, through conductors 700 and 701, so that current is available only when the main drive motor is energized. The Burgess micrometer switch 575 is normally open at contact 702 and closed upon contact 703, as shown upon the drawing. When contact 575 engages contact 703, a circuit for solenoid 576 is established from transformer 572 through conductor 704, contacts 575, 703, conductor 705, switch contactor 706, conductor 707, the coil of solenoid 576, and return conductors 708 and 712 to the transformer, whereby solenoid 576 is energized and the air operated valve 578 opened at its high speed side 577. Solenoid 579 meanwhile is de-energized by reason of the open circuit at contact 702. This condition persists as long as the contactors 706 and 709 of the duplex double throw selector switch 581 are set to the "Hi-Lo" position of Fig. 14. That is to say, the selector switch 581 is set to cause an automatic spindle speed change from high to low speed, from medium to low, or from high to medium, and back to the original speed. As bell crank 560 is actuated as heretofore explained for closing the circuit through contact 702 of the micrometer switch 575, electric current is caused to flow through conductors 705, contacts 575 and 702, conductors 710, switch 709, conductor 711, the coil of solenoid 579, and conductor 712 to the transformer. Thus solenoid 579 is energized and the low speed side 580 of valve 578 is opened, (solenoid 576 being de-energized) whereby the piston of air cylinder 585 is actuated to automatically change the spindle speed back to the originally selected speed. The means for adjusting the machine to any two of three possible speeds will be described hereinafter.

When the selector switch 581 is thrown to the "Lo-Hi" position to cause the spindle speed to automatically change from a low to a higher speed during a machining cycle, the Burgess switch 575 is in its normal position with contacts 575 and 703 closed, and the low speed solenoid 579 is energized while the high speed solenoid 576 is de-energized. When the cam 535 on shaft 532 (Fig. 12) operates to actuate the bell crank 560 and close contacts 575 and 702 of the Burgess switch, the high speed solenoid 576 is energized to operate the high speed side of air valve 578, the low speed solenoid 579 being de-energized.

Figures 2, 7:
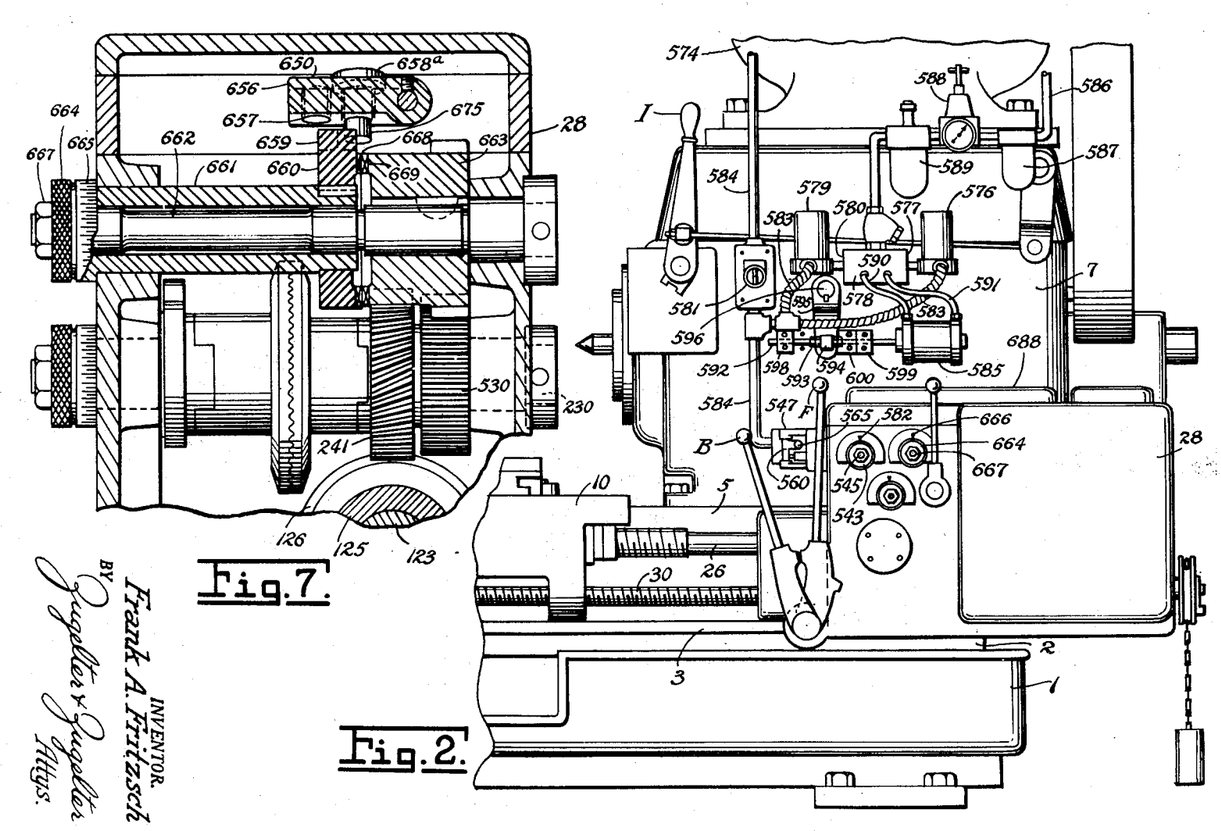
Fig. 2 is a side elevation of the same.
Fig. 7 is a fragmentary transverse section on line 7—7, of Fig. 5.
Figure 15:
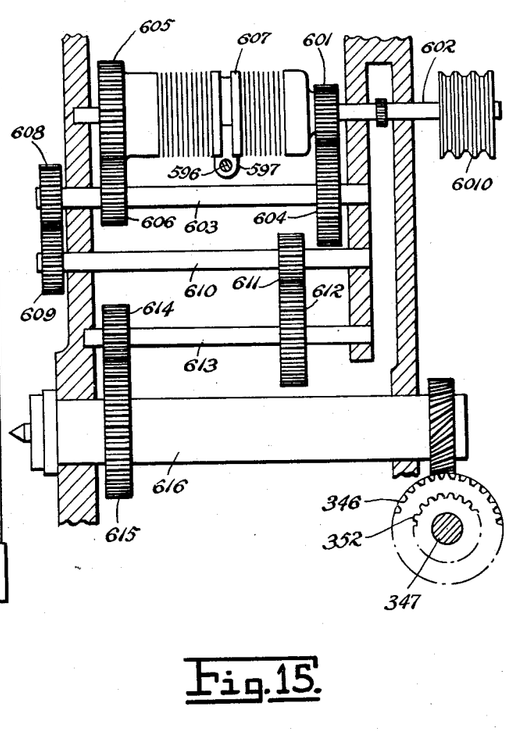
Fig. 15 is a diagrammatic or developed view of a headstock incorporating a modified spindle speed change mechanism.
Figure 17:
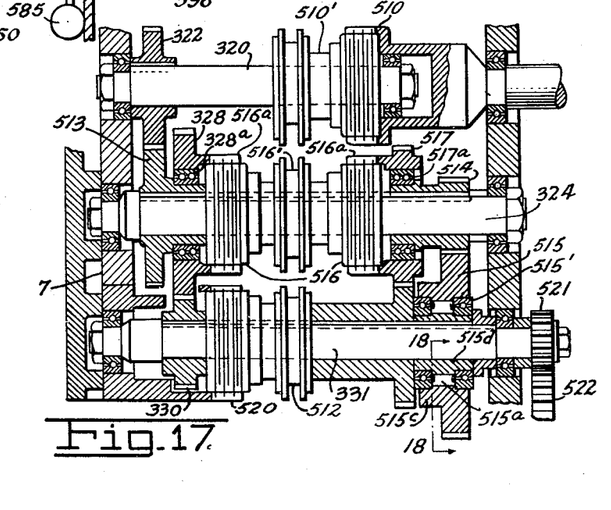
Fig. 17 is an enlarged view in section of spindle speed-change transmission of Fig. 4 showing the friction clutches, the sprag-type over-run clutch and the brake in more detail.

The mounting of the air operated shifting cylinder 585 upon the outer wall of the headstock 7 is shown in Fig. 2. Above the air cylinder 585 is the solenoid operated air valve 578, flanked by the solenoids 576, 579. Compressed air, regulated to meet the condition required, is piped via the supply line 586 through a filter 587, pressure regulator 588, then through a lubricator 589 to the solenoid operated control valve 578. According to the direction of the air flow desired, the air pressure is directed to either end of the air cylinder 585 through the tubes 590, 591 in communication with the solenoid operated control valve 678. The air cylinder in this case has a two inch stroke and a 1¼" bore, but the invention is not limited to a cylinder of this size. As the air pressure forces the piston within the cylinder 585 in either direction it is restricted in movement only by the piston's bottoming at each end of the cylinder. The piston rod 592 is fitted with adjusting and lock nuts 593 at either side of the shifter block 594 carried in the shifter lever 595 to permit setting said shifter lever to suit the stroke of the shifter spool or collar 516' of the double friction disc type clutch 516 in the headstock 7. The shifter lever 595 is keyed to the shaft 596, the inner end of which carries the shifter fork 597 seated in the groove of spool 516', as shown in Figs. 4, 9 and 15.

Guide blocks 598, 599, fixed to the outer wall of the headstock 7, are bored to receive the piston rod 592 for free reciprocable motion therethrough as the piston of the air cylinder 585 is actuated by the speed change mechanism under the control of switches 575 and 581. The current for the solenoids 576 and 579 is carried by conductors described in connection with Fig. 14 and these conductors are disposed within conduits 583 and 584.

Figures 1, 8:
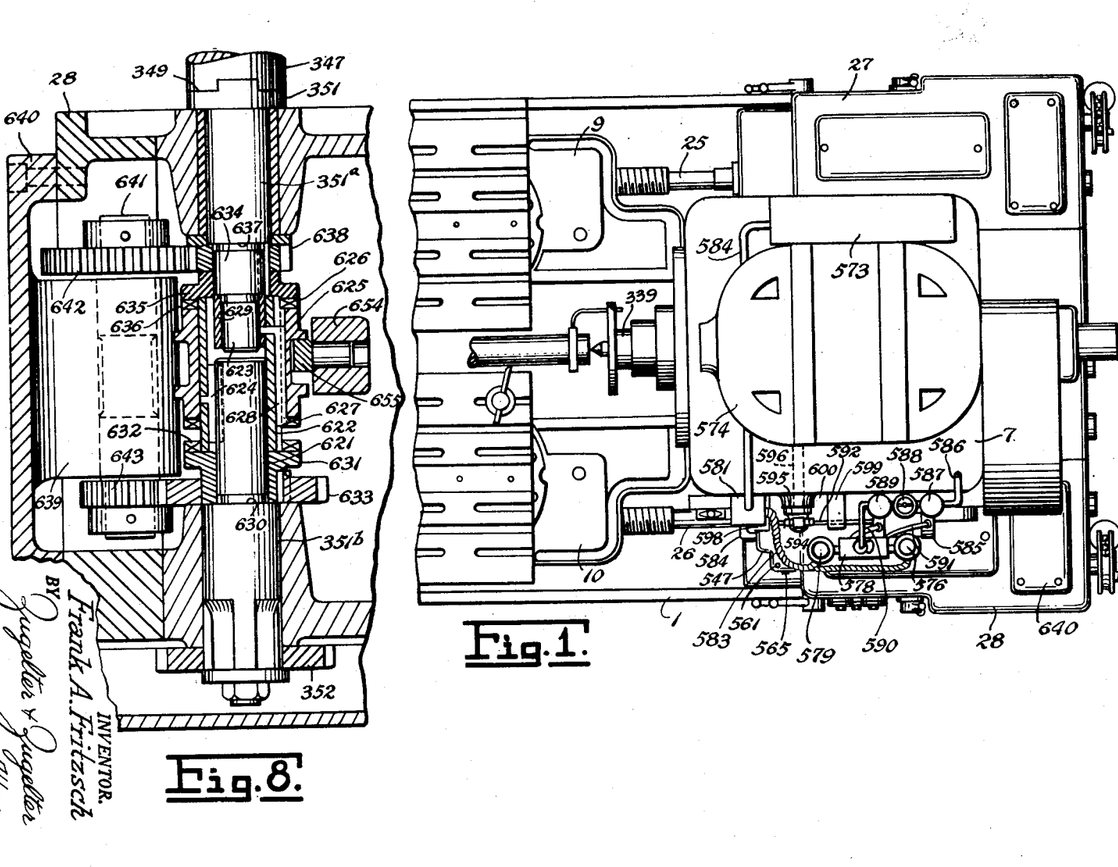
Fig. 1 is a fragmentary top plan view of an automatic lathe constructed in accordance with the principles of this invention, the tailstock end of the lathe being omitted from the drawings since the invention is concerned only with the headstock end.
Fig. 8 is a fragmentary transverse section on line 8—8, of Fig. 5.

Since only two of three possible speed changes may be used in a cycle in the type of headstock just described, it is necessary to incorporate means for limiting the stroke of the piston in those cases where a full stroke of the piston is not required to shift to the two speeds selected for turning or facing a particular job or workpiece. As hereinbefore recited, when the double clutch 516 is in neutral, as shown in Fig. 4, the twenty-three tooth gear 514 on shaft 324 drives the sixty-two tooth gear 515 on shaft 331, thus developing the slowest of the three possible spindle speeds. If the workpiece held in the chuck or between centers of the lathe requires a spindle speed three times that of the slowest speed during a machining cycle, the clutch 516 is shifted to the right, whereby the free-running forty-five tooth gear 517 becomes fixed to the shaft 324 to drive the forty tooth gear 518 which is keyed to shaft 331. Thus it can be seen that in order to obtain the speed change in the exemplified ratio, that is, one to three or vice versa, during a machining cycle, a full stroke of the piston is not required as only that part of clutch 516 which is associated with gear 517 need be actuated by lever 595. Therefore a stop block 600 may be bolted or otherwise detachably fixed to the headstock wall to the right of the shifter lever 595 at a point where lever 595 and the piston will be arrested at the mid-point of the piston stroke as it moves to the right as seen in Figs. 1 and 2. If the double clutch 516 is to be shifted to the left from the neutral position shown, in order to obtain a speed change in the ratio of one to four or vice versa during a machining cycle, the stop block 600 is fixed at the opposite side of the shifting lever 595, thereby to arrest the piston at the mid-point of its stroke, the stroke being limited by the shifting lever 595 abutting against the side of the stop block 600. If the requirements of the workpiece demand a speed change necessitating the shifting of the double clutch 516 to alternately engage the free running gears 328 and 517, which in the exemplified headstock gearing means a spindle drive ratio of one to one-and-a-third, or one third faster, and vice versa, a full piston stroke is necessary to actuate the lever 595 to accomplish the desired speed change. In this case the stop block 600 is removed entirely to permit a full stroke of the air cylinder piston in both directions.

As hereinbefore exemplified three spindle speeds and six spindle speed changes are possible, namely: from low to high, from low to medium, and from medium to high and vice versa, that is, from high to low, from medium to low, and from high to medium.

A modified form of headstock gearing is shown in Fig. 15. This form incorporates but two spindle speeds and two spindle speed changes, namely, from high to low and from low to high, both changes being automatically controlled by the same mechanism which controls the three-speed-change headstock just described. The drive from the brake type pulley 6010 enters on the initial shaft 602, which shaft transfers the drive to the shaft 603 through the twenty-two to forty-four tooth gears 601 and 604 respectively, or through the forty-four to twenty-two tooth gears 605 and 606, respectively. Pulley 6010 is of the type disclosed in U. S. Patent No. 1,600,650 and includes a clutch and brake. Thus it can readily be seen that if the multiple disc type clutch 607 on shaft 602 is shifted to the left to engage gears 605 and 606, the shaft 603 will rotate at twice the speed of shaft 602, and that if the clutch 607 is shifted to the right to engage gears 601 and 604, shaft 603 will rotate at half the speed of shaft 602. Thus it is possible to obtain a maximum speed change of four to one from the initial drive shaft 602 to shaft 603. By varying the gears on shafts 602 and 603 other speed ranges are possible within the structural possibilities of this headstock design. The multiple disc type clutch 607 is automatically shifted in the same manner and with the same lever mechanism as that of the first headstock described above. Fig. 15 shows the clutch shifter fork 597 and the shifter shaft 596 as used in the beforementioned headstock. Spindle 616 is driven by shaft 603 through the pickoff gears 608, 609 to vary the speed, to shaft 610, thence through the gears 611, 612 to shaft 613, and gear 614 to the spindle gear 615 on spindie 616. From this point the control box and traverse drive continues in accordance with the previously recited specifications and the original Patent No. 1,600,650, the traverse drive gear train being omitted from Fig. 15.

In this modified form of headstock, it is not necessary to provide a separated drive clutch and brake as in the first described headstock, since the sprag overrun clutch is not incorporated in this design. As recited above, the starting and stopping of this modified form of headstock is controlled by the brake type pulley 6010 on the initial drive shaft 602, with the starting lever I shown in Fig. 2.

As hereinbefore stated, means are provided for automatically changing the tool feed during the work cycle of the machine. Thus it is possible to change from a coarse feed to a fine feed or vice versa automatically, thereby permitting the machining of complicated workpieces in a minimum period of time without the necessity of reloading the machine or setting up for another operation.

By adding to the control boxes the parts shown in Figs. 5, 7, 8, and 10, automatic tool feed changes are obtainable. Since the front and rear control boxes are identical in construction, only the rear control box 28 will be referred to and illustrated in describing the tool feed change mechanism. The original Patent No. 1,600,650 shows a single or one-part auxiliary feed drive shaft 351, mounted in and transversely of the upper part of the rear control box 28 thereof. In the present invention the auxiliary feed drive shaft 351 is made in two parts 351$^a$ and 351$^b$, each part being a stub shaft rotatively mounted in axially aligned bearings in opposite walls of the control box, as shown in Fig. 8, and joined as described in the following. Fixed against rotation on the counterturned end 621 of the stub shaft 351$^b$, by means of the pin key 624 is the sleeve 622, one end of which extends over and embraces the free rotating bushing 629 on the reduced end 623 of stub shaft 351$^a$ (see Fig. 8). Keyed for free slidable but not rotative movement on the sleeve 622 is the feed change clutch 625, provided with clutch teeth 626 and 627 on the end faces thereof. The key which allows sliding movement of clutch 625 over the keyed sleeve 622 is indicated at 628. Abutting the shoulder 630 on shaft 351$^b$ is the free rotating sleeve 631 provided with teeth 632 for engagement with the teeth 627 of the clutch 625 and keyed to said sleeve is the gear 633. At the opposite side of the clutch 625 and on the counterturned end 634 of the stub shaft 351$^a$ is keyed the sleeve 635 provided on one face thereof with teeth 636 for engagement with the clutch teeth 626. Interposed between the last named sleeve and the shoulder 637 of the stub shaft 351$^a$ is the gear 638. Parallel to the auxiliary feed drive 351, and rotatively disposed in a bearing provided in the bracket 639 depending from the control box cover 640 is the shaft 641, at each end of which is keyed a gear. The gear indicated at 642 is in mesh with the keyed gear 638 on shaft 351$^a$, while the gear 643 is in mesh with the gear 633 keyed to the free running sleeve 631 on shaft 351$^b$.

Since the feed drive enters at 351 through the cross coupling shaft 347 which is suitably coupled to the stub shaft 351$^a$ as at 349, it will be noted that through the four gears 633, 638, 642, and 643 and the clutch 625, two changes of tool feed drive to the stub shaft 351$^b$ can be obtained. The clutch 625 is shifted by the lever 650, shown in Fig. 5, which is automatically controlled, as will be disclosed later. Thus it will be seen that when the clutch 625 is in engagement with the gear 638, as shown in Fig. 8, the two stub shafts 351$^a$ and 351$^b$ become fixed together as a unit to drive the spur gear 352 keyed to the end of shaft 351$^b$ at a predetermined selected speed, while the gear 633 idles on the shaft 351$^b$. When the clutch 625 is shifted into engagement with the free running sleeve 631 to rotate the gear 633 keyed thereon, the direct connection between shafts 351$^a$ and 351$^b$ is broken, the drive from shaft 351$^a$ being transferred to shaft 641 through gear 638 to gear 642, thence to stub shaft 351$^b$ through gear 643 to gear 633, to reduce the speed of the last named shaft, which reduced speed effects a finer tool feed through the change spur gear 352 keyed to the outer end of stub shaft 351$^b$, as recited in the original Patent No. 1,600,650. When the clutch is in this fine feed position, the bushing 629 idles over the reduced end 623 of the shaft 351$^a$, said bushing being pinned to the sleeve 622 by the pin key 628 which also keys the clutch to the said sleeve for reciprocal motion thereon. The ratio of tool feed change can be selected according to the requirements of the work to be machined by changing the gears 638 and 642 on shafts 351$^a$ and 641 respectively.

Figure 5:
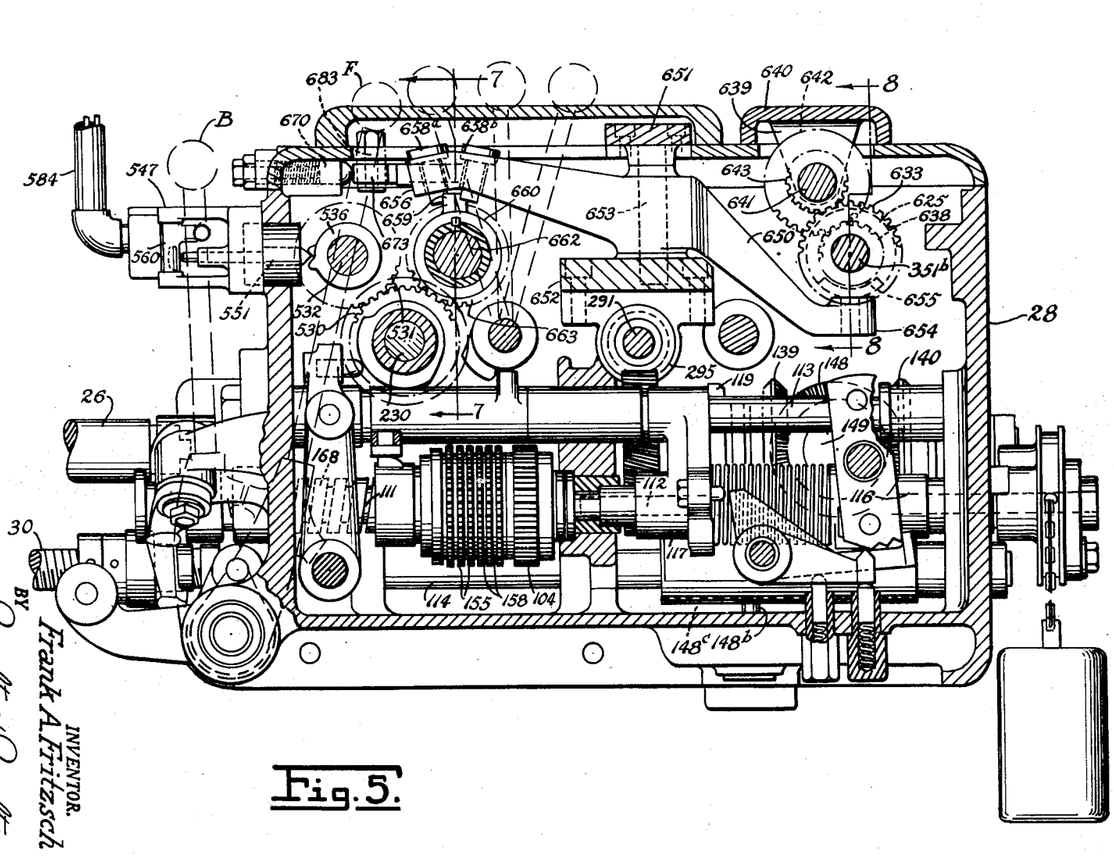
Fig. 5 is a vertical longitudinal section through the rear control box.

As noted above, the clutch 625 on the auxiliary drive 351 is automatically shifted by means of the lever 650 which is supported between two bridge members 651 and 652 (Fig. 5) which transversely span the control box near the top thereof, the said bridge members being suitably fixed to projections extending from the inner walls of the control box 28. The shifting lever extends longitudinally of the control box and is pivoted at substantially its center for horizontal radial movement, the pivoting means being indicated at 653. As noted in Fig. 5, the pivot 653 is disposed vertically through the lever 650 and is journaled in the bridge members 651 and 652 which support said lever. A downwardly extending arm 654 of the shifting lever carries the shifter fork or yoke 655 which is seated in a groove in the clutch 625 of the auxiliary feed drive 351. The opposing arm 656 of the shifter lever is provided near its outer end with four tapped holes 657, in substantially squared arrangement, to receive the two trip screws 658$^a$ and 658$^b$ in a diagonally opposed pair of the said tapped holes, the pair of holes selected depending on whether the tool feed change is to be from coarse to fine or from fine to coarse. The means for actuating the shifter lever 650 is the square trip prong 659 (Fig. 7), laterally extending from the periphery of the ring 660 keyed to the rotatively adjustable sleeve 661 mounted on the feed change trip shaft 662, said shaft being disposed transversely of the control box 28, coplanar with and parallel to the adjacent spindle speed change cam shaft 532, as shown in Figs. 5 and 10. Like the cam shaft 532, the feed change trip shaft 662 takes its drive from the traverse worm wheel shaft 230, through the gear 530 keyed thereon to the trip drive gear 663 keyed to said trip shaft 662, which shaft is mounted in the control box in the same manner as its neighboring shaft 532 as shown in Fig. 10. The outer end of the sleeve 661 extends beyond the box wall and is enlarged to form a knob 664 which is provided with circumferential graduations 665 registrable with a mark 666 upon the face of box 28. The outer end of the shaft is reduced and threaded, and a washer and jamb nut 667 screwed thereon.

The drive from gear 63 to the sleeve 661 is through the teeth 668 and 669 cut in the abutting faces of said sleeve and the gear 663 respectively, said teeth being in engagement when the nut 667 is drawn tight against the knob 664.

As recited above, the trip shaft 662 is driven from the traverse worm wheel shaft 230 which actuates the traverse trip as described in the original Patent No. 1,600,650. In like manner, rotative adjustment of the sleeve 661 on shaft 662 determines the time or point in the cycle of the trip prong 659, which passes between the two trip screws 658a and 658b in the lever 650, when or at which clutch 625 is disengaged by lever 650 from one side of the drive. A spring plunger 670 (Fig. 10), housed in a boss 671 in an end wall of the box 28 and urged forward by a compression spring 672, provides the power to move the clutch 625 into the opposite side of the drive through the pivoted drive lever 673 and the catch member 674, mounted in the box 28 and the lever 650 respectively. Fig. 8 shows the clutch 625 in engagement with the gear 638 on shaft 351a to drive the shaft 351b at a selected rate of coarse feed. Figs. 5, 7, and 10 illustrate the position of the trip prong 659 just before it will contact and pass the trip screw 658a. As the said trip prong contacts and passes the depending reduced shank 675 of the trip screw 658a in the pivoted shifter lever 650, it acts to throw said lever to one side, disengaging the clutch 625 on the auxiliary feed drive 351, which, in this case disengages the coarse feed drive. As the rotating trip prong forces the shifter lever to one side, the catch member 674, carried by the shifter lever and extending from the end face thereof, compresses the drive lever 673 against the spring loaded plunger 670 until the point 676 of the catch member 674 passes the point of the drive lever 673. At this moment, the plunger 670 urges the drive lever 673 forward, the angular face 677 of the said drive lever engaging the angular face 678 of the catch member 674 to further move the shifter lever 650 by the force of the plunger spring 672 until it brings the clutch 625 into engagement with the gear 633 on shaft 351b. When this occurs, direct connection between shafts 351a and 351b is broken, the drive from 351a continuing to 351b through the gears 633, 638, 642, and 643 in the manner hereinbefore recited. Thus the tool feed is automatically changed from a coarse feed to a fine feed, the fine feed beginning at a point determined when the machine is set up with a test piece, and continuing until the end of the cycle, assuming a single trip prong 659 on the ring 660. By adding trip prongs, the feed may be changed repeatedly in any given cycle of operation.

At the end of the cycle, when the control box reverses, the trip prong 659 on the ring 660 returns over its same path, passes by the depending shank 675 of the trip screw 658a and contacts and passes a similar depending shank 679 of trip screw 658b, acting to throw the lever 650 to the opposite side to disengage the clutch 625 from the gear 633 and to reset the feed to its original setting, the same as that shown in Figs. 7, 8, and 10. The action of the drive lever 673 is the same as on the forward movement. That is to say, when the trip prong 659 actuates the shifter lever to the reset position, the lateral movement of the catch member 674 forces the drive lever back against the plunger 670 until the point 676 of the catch member 674 passes the point 680 of the drive lever 673. At this moment the force of the plunger spring 672 urges the drive lever forward, completing the movement of the shifting lever to engage the clutch 625 with the gear 638 on shaft 351a, and locking same in this position until released by the subsequent forward action of the trip prong 659. At this point, the drive lever 673 and the catch member are in the position shown in Fig. 10, the angular side 681 of the catch member 674 lying in abutting relation with the angular side 682 of the drive lever 673. The angles 678 and 681 on the catch member 674 and the corresponding angles 677 and 682 on the drive lever 673 are such as to enable the said catch member in its substantially lateral reciprocating movement to move the drive lever back without substantial frictional resistance. As shown in Fig. 10, the drive lever 673 is pivoted as indicated at 683 on a suitable ledge 684 in the control box 28, while the catch member 674 is secured by its shank 685 in a bore 686 in the shifter lever 650 and secured against displacement and rotation by the set screw 687.

As shown, the traverse worm wheel shaft 230 (Fig. 7), is driven from feed screw coupler shaft 123 through a worm 126 which is mounted on coupler shaft 123 and a worm wheel 241 which maintains register with the same. This is a single worm driving a worm wheel having forty teeth so that in one full revolution of the worm wheel 241 the feed screw 26 will have moved the carriage and cross slide a distance of twenty inches. Since gears 530 and 663 as exemplified are provided with thirty-eight teeth each, the trip prong 659 can travel through one revolution in a twenty-inch movement of the carriage and cross slide. This means that any combination of feed and traverse up to twenty inches (minus the width of the trip prong) can be used before changing the feed. It will thus be seen that regardless of the cycle used, the only limiting factor in the point at which the tool feed is to be changed is the number of revolutions of the feed screw 26 required to cause the trip prong 659 to cut through the trip screws 658a and 658b in the shifter lever 650. Through the medium of the teeth 668 on the trip prong ring 660, selective positioning of the trip prong 659 through the sleeve 661 is possible so that the trip or change of feed can be accomplished at any point in the cycle. The foregoing description refers to an automatic change of feed from coarse to fine. In order to reverse this, that is, to cause an automatic change from fine feed to coarse feed, the trip screws 658a and 658b are changed to the opposite diagonal pair of threaded holes 657 in the shifter lever 650. Access to these trip screws may be had by removing the cover 688 on the control box 28. When the feed change mechanism is set for automatic change from fine to coarse feed, the trip prong 659, in its forward movement, actuates the lever 650 in a direction to shift clutch 625 to be shifted out of engagement with the gear 633 on the shaft 351b, while the pivoted drive lever 673 completes the shifting of said clutch into engagement with the gear 638 to drive the gear 352, on the outer end of shaft 351b for a coarse tool feed, the coarse feed continuing until the end of the cycle, at which time the control box reverses. When this occurs, the trip prong returns over the same path to actuate the shifter lever 650 in the opposite direction to effect a change back to a fine tool feed.

The use of the automatic tool feed change in connection with the standard control box does not affect the normal use of the machine with a single selected feed. As can readily be seen, it is necessary only to loosen the nut 667 at the outer end of the sleeve 661 and shift the trip prong ring 660 out of mesh with the trip drive gear 663, thereby disconnecting the automatic tool feed change. This applies also to the automatic spindle speed change. If a single selected spindle speed is required, the automatic speed change mechanism may be disconnected by loosening the nut 545 on the shaft 532 to disengage the sleeve 541 from the gear 531.

The above described arrangement of speed and feed changes, in conjunction with the standard control boxes, provides for the automatic operation of the speed and feed changes either simultaneously, alternately, or individually, and also provides means whereby either or both change mechanisms may be disconnected without affecting the use of the machine when a single selected spindle speed or tool feed is required. The speed change mechanism, as well as the feed change mechanism, may be provided in connection with either the front or the rear control box, or with both boxes, as the requirements of the job may demand. The feed change mechanism herein described makes possible the timing of tools operating at relatively opposite sides of a piece of work, in such manner that one tool may approach the work at one rate of feed, make a cut to a predetermined point, automatically change to a coarser or finer rate of feed, and pause while the opposite tool performs a similar or different operation upon the piece, the operations being automatic from the time they are initiated until, after completion of the work, the carriages are returned to the starting point with the tool slides in retracted position. Likewise the speed change described herein may be provided in either the front or the rear control box or both, as conditions warrant. The tool may cut into a workpiece at a selected rate of spindle speed, and at a predetermined point in the cycle, the spindle speed may be caused to change, without a hesitation, to a slower or faster speed automatically, the cut continuing at the changed speed until the end of the cycle.

It can readily be seen from the foregoing specifications that it is not necessary for the operator of the machine to manually change tool feed or spindle speed during the machining of a workpiece, since such changes are in the present machine automatically controlled. After the various controls have been set with the aid of a test piece, the operator loads the workpiece and starts the machine with the start and stop lever I. All subsequent operations are automatic until the end of the cycle. Since it is not necessary for the operator to devote his attention to the machine during a cycle in order to manually change the tool feed or spindle speed at proper time to obtain a desired result, he may devote his time during a machining cycle to preparing the next workpiece for loading, or to preparing his time sheets and production records, or to doing other chores incident to the operation of such equipment. Finished workpieces of equal size, quality, and workmanship are also assured by such automatic controls, in addition to increased production.

It is understood, of course, that various structural changes may be made within the scope of the appended claim, without departing from the spirit of the invention.

What is claimed is:

A change speed drive for a lathe spindle comprising an input power shaft and change gear mechanism connecting said input shaft and spindle for selectively changing the speed of rotation of the spindle with respect to the speed of rotation of the input shaft, a cam shaft, a reversing driving connection operatively connected to said cam shaft and said spindle and arranged to limit the rotation of said cam shaft to not more than about one complete revolution of 360° in either direction, said cam shaft having cams thereon and means for adjusting the relative position of said cams with respect to the starting point of said cam shaft when turning one revolution in one direction, a plunger actuated by one of said cams when said cam shaft turns in one direction, an electric switch having at least two circuit controlling positions and actuated by said plunger to one of said positions, a second plunger actuated by another of said cams adapted to lock said first mentioned plunger in its actuated position and to release said first mentioned plunger when said cam shaft is turning in the opposite direction, means for reversing the direction of rotation of said cam shaft when said shaft has turned one revolution in either direction about its longitudinal axis, and means controlled by said switch for actuating said spindle speed-change mechanism.

FRANK A. FRITZSCH.

REFERENCES CITED

The following references are of record in the file of this patent:

UNITED STATES PATENTS

| Number | Name | Date |
|---|---|---|
| 1,340,811 | Ballman | May 18, 1920 |
| 1,420,939 | Olson | June 27, 1922 |
| 1,600,650 | Bird | Sept. 21, 1926 |
| 1,905,113 | Lasker | Apr. 25, 1933 |
| 1,938,780 | Nenninger et al. | Dec. 12, 1933 |
| 1,982,612 | Hoelscher | Nov. 27, 1934 |
| 2,156,596 | Lloyd | May 2, 1939 |
| 2,255,739 | Curtis | Sept. 9, 1941 |
| 2,266,283 | Spengler | Dec. 16, 1941 |
| 2,266,598 | Hale | Dec. 16, 1941 |
| 2,340,912 | Van Hammersveld | Feb. 8, 1944 |
| 2,357,396 | Fuller | Sept. 5, 1944 |